(12) United States Patent
Romansky

(10) Patent No.: US 7,222,105 B1
(45) Date of Patent: May 22, 2007

(54) INTERNET ADVERTISEMENT METERING SYSTEM AND METHOD

(75) Inventor: Brian M. Romansky, Monroe, CT (US)

(73) Assignee: Pitney Bowes Inc., Stamford, CT (US)

( * ) Notice: Subject to any disclaimer, the term of this patent is extended or adjusted under 35 U.S.C. 154(b) by 1295 days.

(21) Appl. No.: 09/658,079

(22) Filed: Sep. 11, 2000

(51) Int. Cl.
*G06F 17/00* (2006.01)

(52) U.S. Cl. .......................... 705/57; 705/58; 380/201

(58) Field of Classification Search ................ 705/408, 705/57, 58; 235/375; 380/201, 202, 203
See application file for complete search history.

(56) References Cited

U.S. PATENT DOCUMENTS

| | | | | |
|---|---|---|---|---|
| 4,517,410 | A | * | 5/1985 | Williams et al. ............ 379/73 |
| 4,807,139 | A | * | 2/1989 | Liechti .................. 364/464.02 |
| 4,837,701 | A | * | 6/1989 | Sansone et al. ........ 364/464.03 |
| 4,876,571 | A | * | 10/1989 | Nakamura et al. ............ 399/84 |
| 5,715,164 | A | * | 2/1998 | Liechti et al. ........... 364/464.2 |
| 5,739,919 | A | * | 4/1998 | Lee et al. ................... 358/407 |
| 5,852,813 | A | | 12/1998 | Guenther et al. ........... 705/408 |
| 5,905,800 | A | | 5/1999 | Moskowitz et al. |
| 5,982,891 | A | | 11/1999 | Ginter et al. |
| 6,014,698 | A | | 1/2000 | Griffiths |
| 6,044,401 | A | | 3/2000 | Harvey |
| 6,442,529 | B1 | * | 8/2002 | Krishan et al. ............... 705/14 |

FOREIGN PATENT DOCUMENTS

| | | |
|---|---|---|
| CA | 2272506 | 1/2000 |
| JP | 404216256 A * | 8/1992 |
| WO | WO 98/26529 | 6/1998 |
| WO | WO 00/08909 | 2/2002 |

OTHER PUBLICATIONS

IBM Technical Disclosure Bulletin; Title:Track follow integrator pre-charge prediction utilizing an averaged integrator value; TDB-ACC-No.: NN9503273; Mar. 1, 1995.*

* cited by examiner

*Primary Examiner*—Elisca Pierre Eddy
(74) *Attorney, Agent, or Firm*—Brian A. Lemm; Angelo N. Chaclas

(57) ABSTRACT

A method and a system for metering an advertisement having a message to be presented to a plurality of users of a communications network, wherein the metering is used to count the number of times the message is actually presented to one or more users. The method comprises the steps of embedding a code in the message; and detecting the embedded code to count the number of presentations. Preferably, the embedded code contains the client's identity so as to allow the server to identify the client who should pay for the advertisement, and a rate code for calculating an advertisement charge to the client. In order to prevent an unscrupulous host web server from manipulating the metering system, a challenge-response mechanism is used to ensure the metering system has not been reconnected through an alternate channel of the network. Furthermore, a click-through monitoring process is used to monitor whether the user actually clicks on the advertisement image to learn more about the advertised service or product.

29 Claims, 6 Drawing Sheets

INTERNET ADVERTISEMENT METERING SYSTEM AND METHOD

TECHNICAL FIELD

The present invention relates generally to a method and device for securely metering digital content conveyed to a user from a server and, more particularly, to a meter for verifying that a paid advertisement is actually presented on the screen of an Internet user who visits the web site that displays the advertisement.

BACKGROUND OF THE INVENTION

The growth of the Internet has created significant opportunities for electronic commerce. The primary business that drives growth in the Internet today is advertising. Web technology has made it possible to target advertising information to viewers with specific interests. What is missing is the ability for the service provider to efficiently bill the client for these dynamic opportunities to reach a potential customer.

Internet based advertising is currently billed in a fashion, which is similar to print, radio or television broadcast advertising. In this fashion, the billing is based on the availability of the advertisement to the viewer, and not on the actual number of viewers. Take television broadcast, for example, where billing is based largely on the rating of the program during which the advertisement is broadcast and the total time span of the advertising broadcast. Although the rating of the program correlates strongly with the number of viewers who are likely to view the program, it is derived from a survey prior to the actual broadcast of the program. While buying advertising time during a popular program could certainly help expose a product or service to a larger segment of the population than the potential viewers of a less popular program, the number of actual viewers cannot be precisely known. Likewise, in Internet based advertising, buying a segment of the web page on a popular portal is very likely to expose the product or service to more web surfers, but this exposure is estimated based on statistics and not actual numbers.

The current model for most Internet advertising consists of an agreement between a host web server and a client who has a product or service that he or she wishes to advertise. Typically, a fee is set based on the expected number of viewers, and the amount of screen space occupied by the message. This would be a fixed fee that is prepaid by the client. The difficulty with this arrangement is that the client has no reliable means of verifying that the host web server is meeting the server's part of the bargain. Certainly the client could check periodically to ensure the advertisement message appears, but the client has no method of knowing how many users see the advertisement. Any traffic logging information regarding the number of hits is controlled by the host web server. Accordingly, a dishonest host web server could overcharge the client by manipulating the traffic logging information.

Thus, it is advantageous and desirable to provide a method and system to accurately and securely track the distribution of digital information. This information may include advertisement distributed through the Internet. Once the distribution of Internet advertising can be accurately measured, alternative mechanisms of payment for Internet advertising will become possible. For example, instead of prepaying for advertising space over a period of time, a client could pay a small amount every time the advertisement appears.

SUMMARY OF THE INVENTION

The first aspect of the present invention is a method for metering digital content having a message posted by a client to be presented to a plurality of users of a communications network, wherein a code is embedded in the message and wherein the metering is used to count the number of times the message is actually presented to one or more users. The method comprises the steps of embedding a code in the message, detecting the embedded code, and counting the number of presentations so that a monetary amount to be charged to the client can be computed.

Preferably, the message is presented in an image format to be implemented as a stream of image data contained in a network data stream and the code is embedded in the image data. The method further comprises the step of monitoring the network data stream in order to detect the embedded code.

Preferably, the code is embedded in a steganographic fashion such that the code is virtually undetected by the users.

Preferably, the embedded code contains a rate code for calculating an advertisement charge to a client, and the method further comprises the step of calculating the advertisement charge based on the number of presentations and the rate code. It is possible that the rate code includes a fixed rate, a variable rate based on the time and/or date of presenting the advertisement to the users, a charge rate based on the image size relative to the display screen, and a charge rate based on the destination domain.

Preferably, the method includes a mechanism to retrieve network traffic information by a trusted third party. This information would be used to bill advertisers or charge an existing account. Alternatively, the method may include a local vault, which would store prepaid funds, which would be debited each time a specific code is observed in the network traffic. This vault or set of vaults would be refilled from a trusted server using a secured messaging protocol.

The second aspect of the present invention is an advertisement metering system to be implemented on a communications network to count the number of times an advertisement message posted by a client is presented to a user of the communications network, wherein the advertisement message is contained in the network data in the form of a data stream embedded with a code, and the data stream is conveyed to the network by a conveying device. The metering system includes a monitoring mechanism operatively connected to the conveying device for monitoring the data stream in order to detect the embedded code, and a counting device to count the number of presentations based on the detected embedded code so that a monetary amount to be charged to the client can be computed based on the number of presentations.

Preferably, the metering system further comprises a challenge-response mechanism, connected to the network independently of the web server, to allow a remote system to confirm that the metering device has not been disconnected or tampered with.

Preferably, the metering system further comprises a mechanism for metering the events when a user uses a click-through process to learn more about the advertisement message.

Preferably, the metering system further comprises a vault for the client to deposit a fund.

The third aspect of the present invention is a metering device for metering an advertisement having a message posted by a client in the form of a data stream to be presented to a user of a communications network, wherein the message is embedded with a code for indicating that the message is actually presented to the user. The metering device includes a mechanism for detecting the embedded code, and a mechanism for counting the number of presentations based on the detected embedded code.

Preferably, the metering device further includes a mechanism for calculating a charge to a client for posting the advertisement message based on the number of presentations and a vault to allow the client to deposit a fund to pay for the advertisement message.

The fourth aspect of the present invention is an algorithm for metering an advertisement which has a message contained in a network data stream in order to present the message to a user of a communications network, wherein the message is embedded with a code so as to allow the number of times the message is actually presented to the user to be counted. The metering algorithm includes the steps of monitoring the network data stream in order to detect data representative of the embedded code, recording the amount of detected data and calculating an advertisement charge according to the amount of detected data.

Preferably, the metering algorithm further includes the steps of determining a rate for charging a client based on the embedded code so as to calculate the advertisement charge, debiting a monetary amount based on the calculated advertisement charge, and looking up client information in order to determine the charge rate.

The present invention will become apparent upon reading the description taken in conjunction with FIGS. 1 to 7.

DETAILED DESCRIPTION

Figure 1:
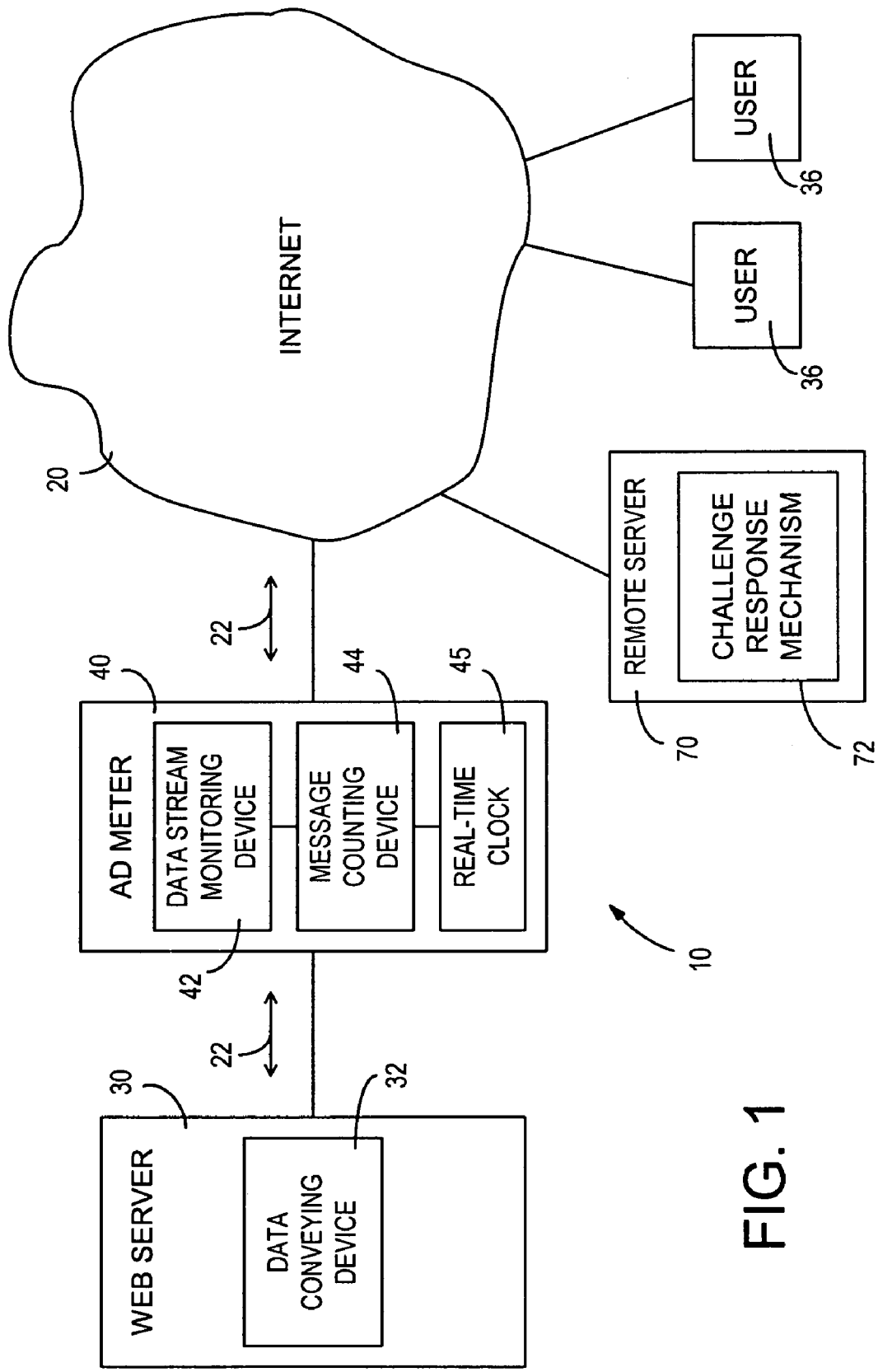
FIG. 1 is a block diagram illustrating an advertisement system, which is implemented in a communications network, such as the Internet.

FIG. 1 shows an advertisement system 10 to be implemented in a communications network, such as the Internet 20. Typically, a client who has a product or service that he or she wishes to advertise on the web uses an advertising service from a host web server 30. The advertisement is incorporated in a network data stream 22 as a message 24 (FIG. 2) and appears as an image on a web page displayed on a computer screen of a user 36, for example. As shown, the host web server 30 has a data conveying device 32 to send network data 22 to the Internet 20. A metering device 40, which resides near the host web server 30, is used to meter the advertisement message 24. The metering device 40 has a data stream monitoring device 42 to monitor the network data 22 passing through the metering device 40 in order to detect the presence of an advertisement message 24 in a stream of network traffic. The metering device 40 further includes a counting device 44 to count the number of times the advertisement message appears in the network traffic. Based on the counted number, the metering device 40 debits the client according to a charge rate that the host and the client have agreed upon.

The metering functionality of the metering device 40 can be built in a secure enclosure and maintained by a trusted third party so that both the host and the client can be assured that the counted number will not be altered. Preferably, the metering system 10 also includes a challenge-response mechanism 72, connected through a trusted remote server 70 to the network 20 independently of the host web server 30. The challenge-response mechanism 72 is used to confirm that the metering device 40 has not been disconnected or modified. The details of the challenge-response process are described in conjunction with FIG. 6.

Figure 2:
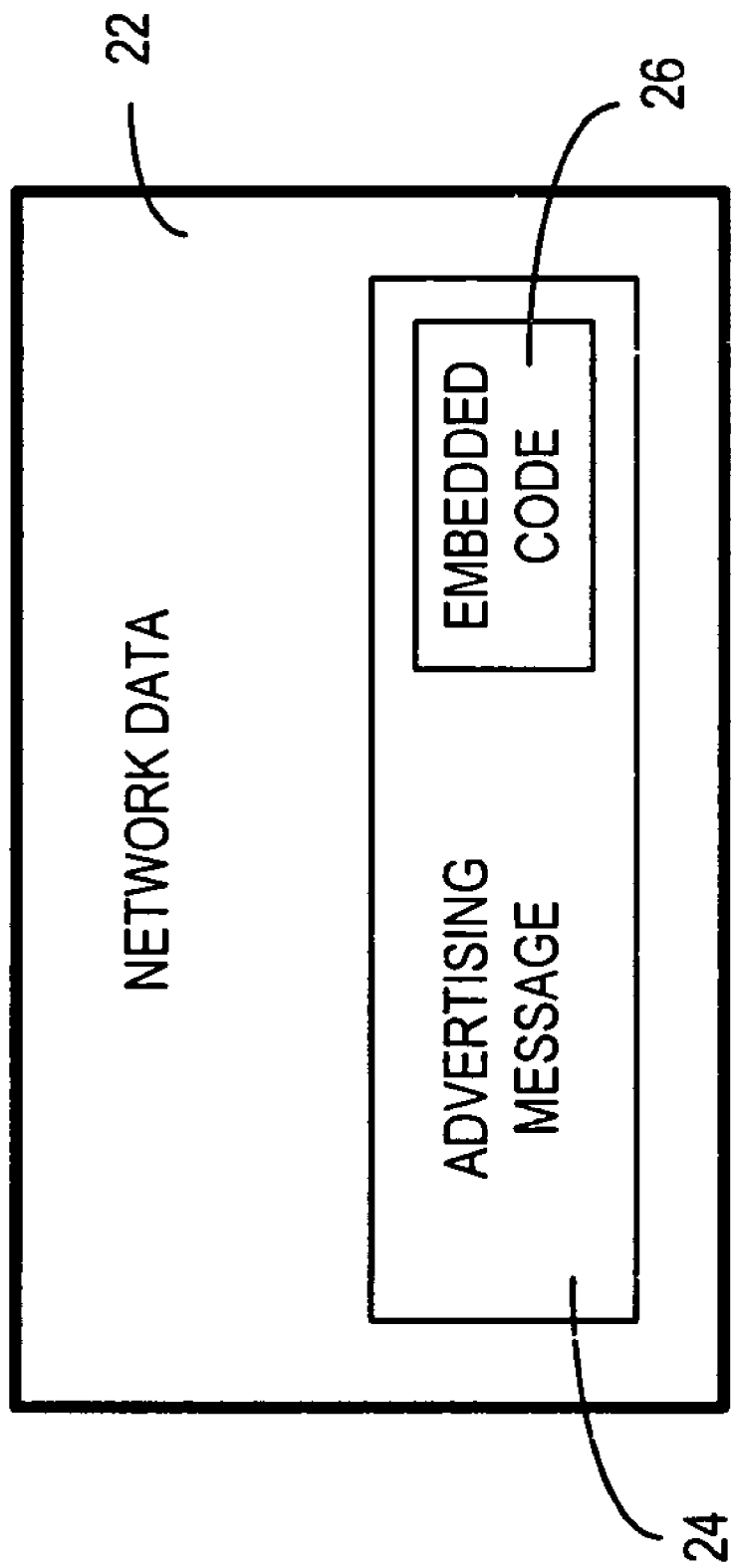
FIG. 2 is a block diagram showing the network data containing the advertisement message.

In order to make the metering of Internet based advertisement effective, it is preferred that a code 26 is embedded in the advertisement message 24 which is part of the network data 22, as shown in FIG. 2. Techniques for embedding information inside of an image or a message are well known. Preferably, a technology commonly referred to as steganography is used for code embedding. Typically, steganography is used for placing an electronic watermark on images so that the images can be traced back to the original source. The same technology can be used to identify which client should pay for the display of a particular image on a web page.

Optionally, the client information can be encoded directly into an HTML data stream without the use of steganography. However, steganographically embedding a code has a number of advantages over embedding the code by other methods. The use of steganography makes it difficult for a user 36 to view the embedded information, which may contain the client name and a rate code that could be useful to a competitor. The steganographic technique would also make it difficult for the host web server 30 to change or modify the message or the embedded data. Thus, the embedded code can be used to ensure that the billing information remains accurate. Furthermore, the use of steganography enables the client to prevent a third party from using the graphics associated with the advertisement message without paying royalties to the client. The above-mentioned advantages could be significantly enhanced if a cryptographic protocol is also used to ensure the authenticity and integrity of the steganographic data.

The advertisement metering device 40 provides a variety of methods for metering advertisement transactions. The simplest form is to maintain a count of the number of times that a particular advertisement message is presented to the network 20. The more advanced option would be to allow the client to load the metering device 40 with prepaid funds in a vault 52 (FIG. 4), allowing the metering device 40 to withdraw funds to pay for the advertising service. In general, the method of metering an advertisement message to be presented to the users 36 of a communications network 20 is illustrated in FIG. 3.

Figure 3:
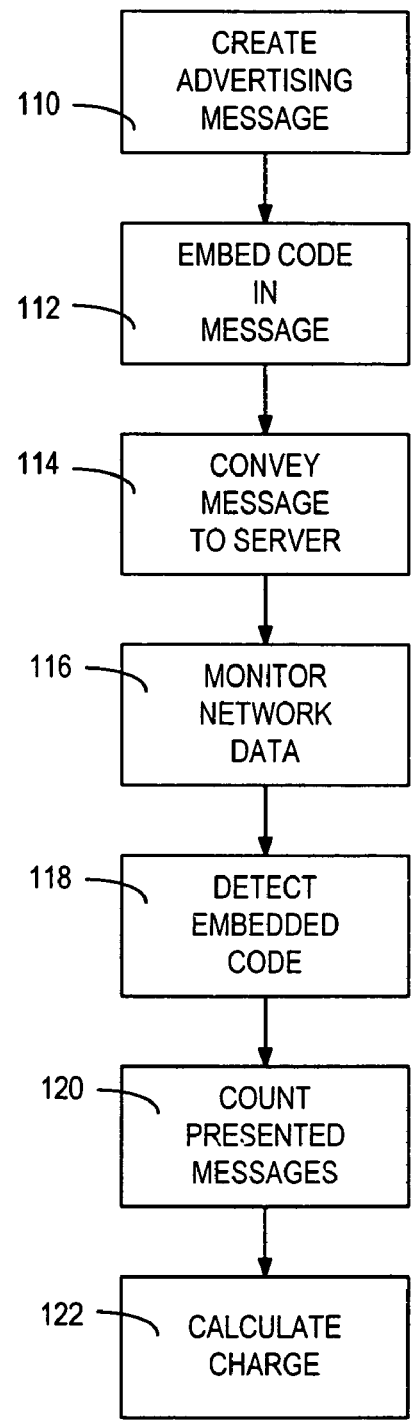
FIG. 3 is a flow chart illustrating a method for metering Internet based advertisements.

As shown in FIG. 3, the advertisement message 24 is created or acquired at step 110 and a code 26 is embedded in the message 24 at step 112. The message with the embedded code is conveyed to the host web server 30 at step 114. This message will be incorporated into the network data stream 22, which is conveyed to the network 20 by the host web server 30. As the metering device 40 is connected to the network 20, it monitors the network data 22 with its data stream monitoring device 42 at step 116. At the same time, the metering device 40 looks for the embedded code 26 at step 118 in order to count the number of times the message 24 is presented to the user 36 at step 120. Based on the counted number and the rate code contained in the embedded code 26, the charge is calculated at step 122. The rate code may include a fixed rate, or a variable rate based on the time and/or date when presenting the advertisement message 24 to the users 36. Thus, it is preferred that the metering device 40 also includes a secure real time clock 45 which would allow the rate to vary with the time of day. Preferably, the advertisement message 24 is presented as an image to be displayed on a screen, and the rate code contains a charge rate based on the size of the displayed image relative to the size of the screen. Furthermore, if the communications network 20 includes a plurality of destination domains, the rate code may include a charge rate based on the destination domain of the recipient of the advertisement message.

Figure 4:
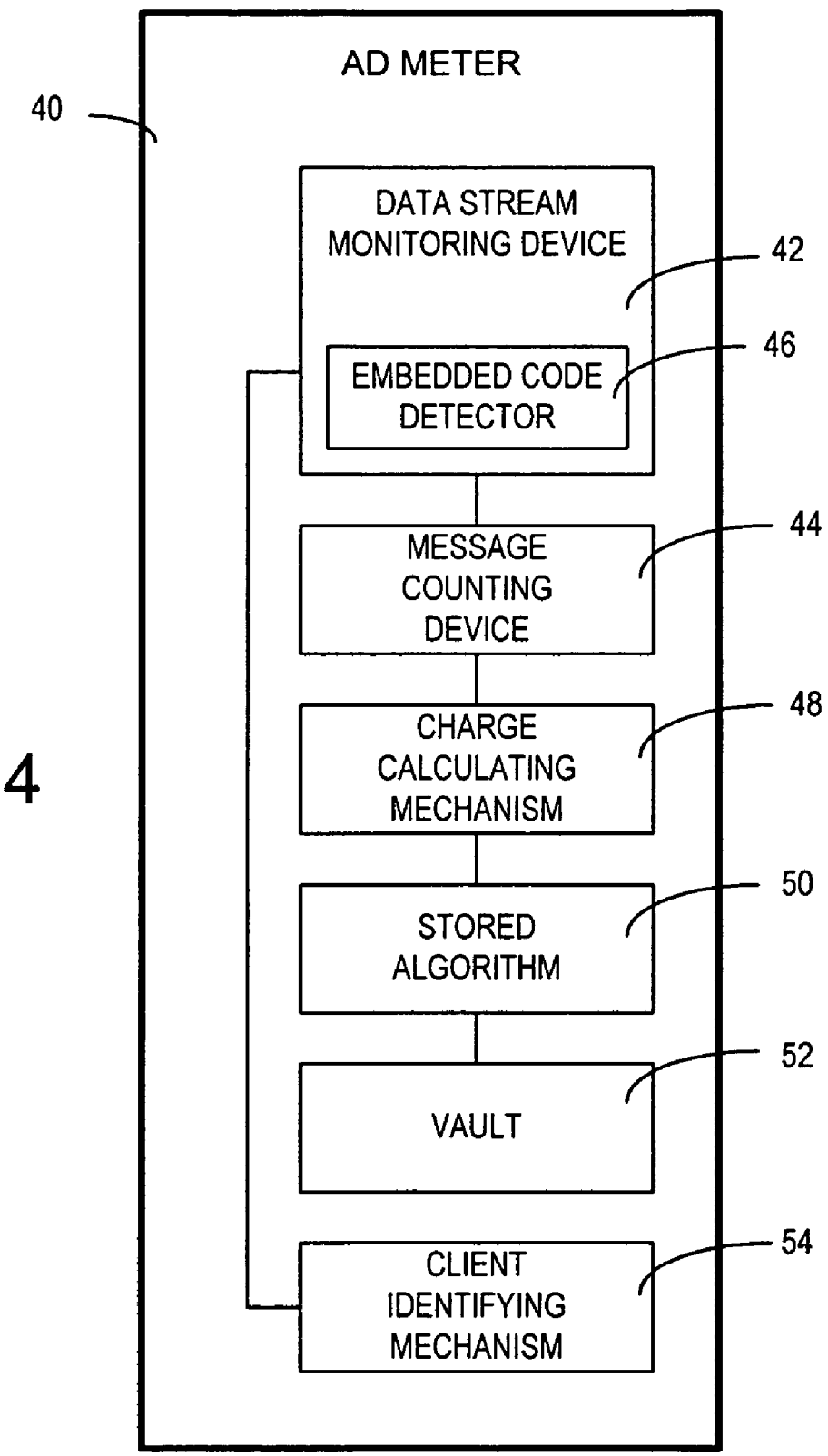
FIG. 4 is a block diagram showing the preferred embodiment of the advertisement metering device, according to the present invention.

In order to carry out the advertisement metering method as described in conjunction with FIG. 3, the preferred embodiment of the advertisement metering device 40 would also include an embedded code detector 46 to detect the embedded code 26 from the network data stream 22, and a charge calculating mechanism 48 to calculate the charge based on the counted number of presentations by the counting device 44, as shown in FIG. 4. The metering device 40 further includes a mechanism 54 to identify the client according to client information included in the embedded code 26, and a stored algorithm 50 to carry out the various steps in the advertisement metering process.

Furthermore, in order to take advantage of the information collected by the metering device 40, it is essential for usage information to be returned to a trusted third party. For this reason, the trusted remote server 70 will periodically query the metering device 40 to retrieve the information that it has collected. This information will be used to create a bill or debit an account of an advertiser. This information download must be accomplished using a standard public key cryptographic protocol in order to ensure the integrity and authenticity of the data.

Figure 5:
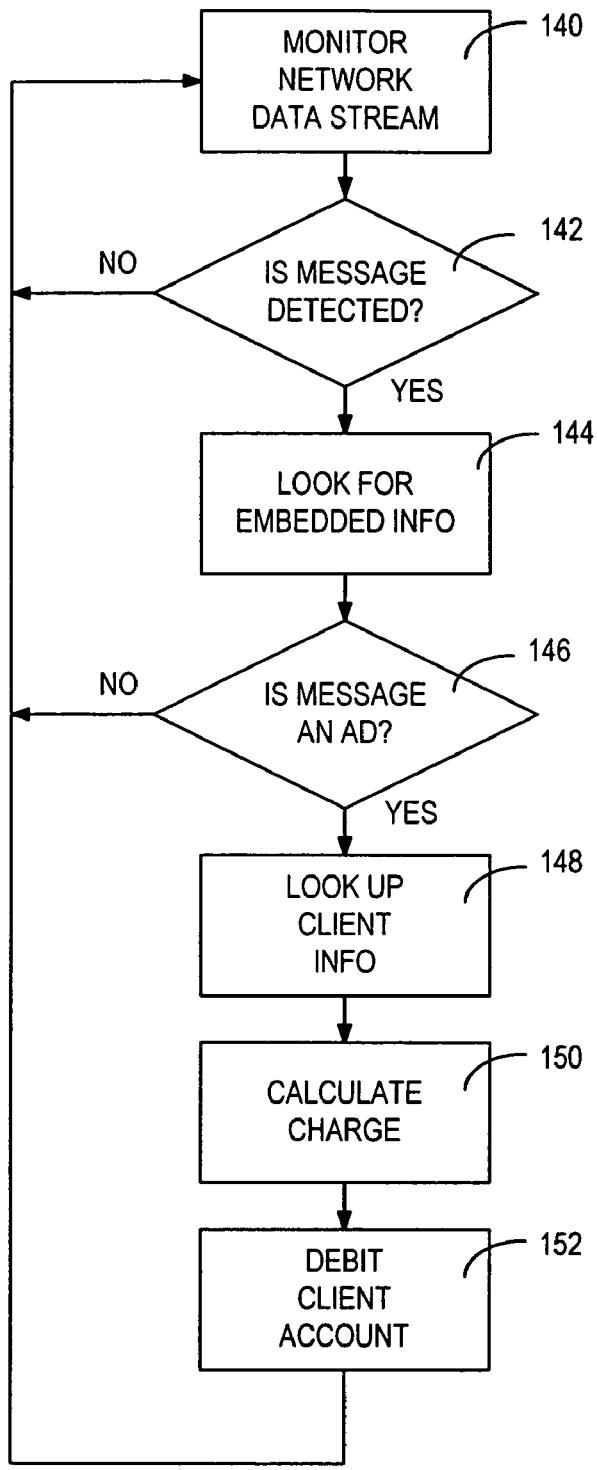
FIG. 5 is a flow chart illustrating an algorithm for tracking an advertisement in a network data stream and for monitoring the advertising message.

An exemplary advertisement metering algorithm 50 is shown in FIG. 5. While monitoring a network data stream 22 at step 140, the data stream monitoring device 42 looks for an image or message at step 142. If no image or message is found, the process loops back to step 140 until such an image or message is found. Subsequently, the embedded code detector 46 looks for embedded information to determine whether the image/message is an advertisement at step 146. If the answer is yes, then the client information contained in the embedded code is looked up at step 148. Based on the rate information found in the embedded code 26 or elsewhere in the metering device 40, the charge to the client is calculated at step 150 and funds are withdrawn from the client account at step 152. If funds are available in the vault 50, then funds can be withdrawn from the vault 50 and credited to the host web server 30.

It should be noted that a potential weakness of the Internet advertisement meter is that an unscrupulous web server could disconnect the metering device 40 from the Internet and place it on an isolated network. In this scenario, the host web server 30 could simulate a large amount of traffic through the metering device 40 and the simulated traffic could result in unfair charges to the client. In order to prevent such a scenario from happening, a trusted remote server 70 can connect a challenge-response mechanism 72 to the Internet 20 for health monitoring. An exemplary procedure for health monitoring is described in conjunction with FIG. 6.

Figure 6:
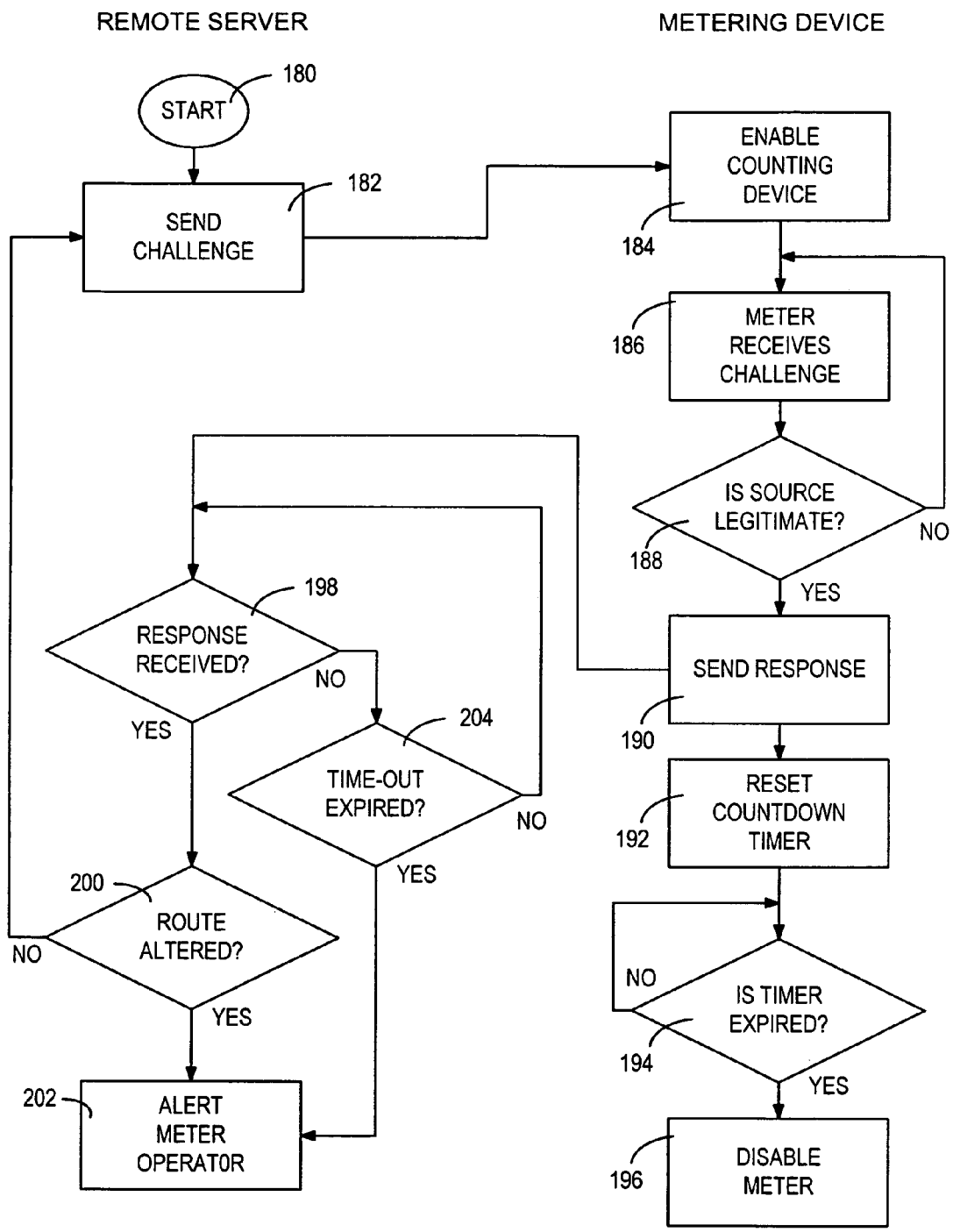
FIG. 6 is a flow chart illustrating a health monitoring process.

As shown in FIG. 6, the trusted remote server 70 sends a challenge to the metering device 40 at step 182. If the counting device 44 in the metering device 40 has not been enabled, then the trusted remote server 70 enables the counting device 44 at step 184. As the metering device 40 receives the challenge at step 186, it verifies the source of the challenge at step 188. If the source is legitimate, then the metering device 40 generates a response at step 190. The metering device 40 resets an internal countdown timer (not shown) at step 192 after responding to the challenge. If the remote server 70 does not receive a response from the metering device 40 within a predetermined time period, it will alert the meter operator at step 202 and inform the operator that the metering device 40 is not available. Whether or not the predetermined time period has been expired is checked at step 204.

If a response is received at step 198, the remote server 70 also checks the route that is used to contact the metering device 40 at step 200 to make sure that the metering device 40 has not been reconnected through an alternate channel to the Internet 20. If the route has been altered, then the operator is notified of the fact at step 202. The internal countdown timer in the metering device 40 is reset at step 192 to a specific amount of time after each successful challenge is received by the metering device 40. The challenge is generated by the remote server 70 in a fixed time basis in order for the remote server 70 to keep in contact with the metering device 40. When a challenge is responded to within a time threshold and it is determined at step 200 that the route has not been altered, a new challenge is generated at step 182 in order to keep the counting device 44 in the metering device 40 functional. When a challenge is not responded to successfully within the maximum time threshold, the internal countdown timer will expire at step 194 and the counting device 44 in the metering device 40 will be disabled at step 196. In this state, the metering device 40 is only able to log the presence of advertising contents, but it does not meter usage. Active metering will only be restored upon receipt of a new challenge, as shown at step 184. It should be noted that the technique for the creation of the challenge-response pair is well known. For this technique to be useful for the present invention, however, the metering device 40 must be able to verify the source of the challenge (at step 188) and the remote server 70 must be able to verify (at step 200) that the metering device 40 produces a correct response responding to the most recent challenge (at step 190).

Preferably, a higher rate is charged to the client when the user 36 actually clicks on the advertisement image to learn more about the advertised product or service than the rate when the image simply appears on the screen. To support this click-through metering mode, the metering device 40 embeds a special identification tag in the link associated with the advertisement message. This special link will cause the browser of the user 36 to contact the metering device 40 and also cause the browser to be redirected to the actual target site. The special tag associated with the link will allow the metering device 40 to ensure that the link recently sent out is part of a paid-for advertisement. An exemplary process for the click-through metering is illustrated in FIG. 7.

Figure 7:
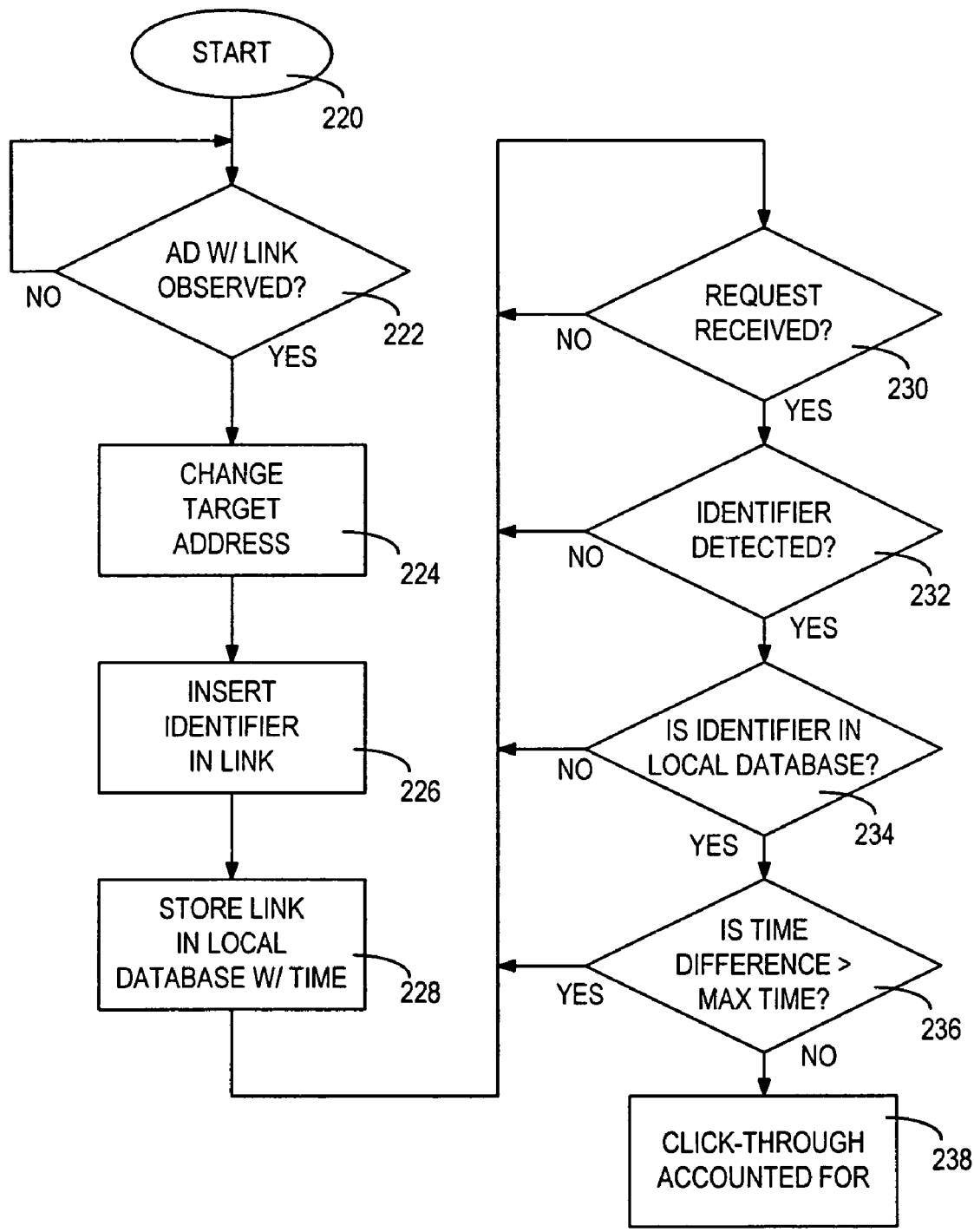
FIG. 7 is a flow chart illustrating a click-through metering process.

As shown in FIG. 7, an advertisement image with a click-through link is detected by the metering device 40 at step 222 as the image is sent from the host web server 30 to the user 36. The metering device 40 modifies the click-through link in the advertisement image at step 224. More particularly, the metering device 40 changes the target address in the click-through link at step 224 to refer the address to the metering device 40 itself. The metering device 40 further inserts a unique identifier in the click-through link at step 226. At step 228, the link is stored in a local database with the current time. If the end user views the advertisement image and clicks on the click-through link, this will cause the browser to send a request back to the metering device 40. After the metering device 40 receives the request as shown at step 230, it should be able to detect an identifier in the request. If the identifier is present as shown at step 232, the metering device 40 determines whether the identifier is stored in the local database at step 234. If the identifier is in the local database, the metering device 40 checks at step 236 the time that is elapsed since the identifier was stored (at step 228). If the elapsed time does not exceed the maximum time threshold, the metering device 40 redirects the user 36 to the desired target, and the metering device 40 accounts for the click-through of the target advertisement at step 238. The reset of the internal countdown timer for setting a maximum time threshold is significant because the value of a click-through is time dependent. Web pages may be captured and stored in a variety of ways, but an advertiser will only want to pay extra money for a click-through that occurs within a limited time after seeing the original advertisement.

Thus, the present invention has been disclosed in the preferred embodiments thereof. It will be understood by those skilled in the art that the foregoing and various other changes, omissions and deviations in the form and detail thereof may be made without departing from the spirit and scope of this invention.

What is claimed is:

1. A method of metering digital content having a message to be presented to users of a communications network, said method comprising:
    embedding a code in said message, the embedded code containing a rate code for calculating a charge for presenting the message in the digital content;
    detecting the embedded code;
    based on the detected embedded code, counting the number of times the message is presented to the users of the communications network; and
    calculating the charge based on the rate code and the counted number of times the message is presented to the users of the communications network.

2. The method of claim 1, wherein the communications network includes the Internet.

3. The method of claim 2, wherein the message is presented in an image format to be implemented as a stream of image data contained in a network data stream and the code is embedded in the image data, said method further comprising:
    monitoring the network data stream to detect the embedded code.

4. The method of claim 1, wherein the code is embedded in a steganographic fashion.

5. The method of claim 1, wherein the message is presented by a server, and wherein the embedded code contains a client identity associated with the digital content.

6. The method of claim 1, wherein the rate code includes a fixed rate.

7. The method of claim 1, wherein the rate code includes a variable rate based on the time and/or date of presenting the message to the users of the communications network.

8. The method of claim 1, wherein the message is presented as an image on a display screen, and the image has a size relative to the display screen, and wherein the rate code contains a charge rate based on the image size.

9. The method of claim 1, wherein the communications network includes a plurality of destination domains, and wherein the rate code contains a charge rate based on the destination domain.

10. The method of claim 1, wherein the message is an advertisement.

11. A metering system for a communications network having network data, the metering system adapted to count the number of times a message included in digital content is presented to users of the communications network, the message being contained in the network data in the form of a data stream embedded with a code, the data stream being conveyed to the network by a conveying means, said system comprising:
    means, operatively connected to the conveying means, for monitoring the data stream in order to detect the embedded code;
    means, operatively connected to the monitoring means, for counting a number of presentations to users based on the detected embedded code; and
    a mechanism, remote from the monitoring means, for sending an authentication message to the monitoring means on a fixed time basis,
    wherein the monitoring means is adapted to disable the counting means when the monitoring means does not receive the authentication message on the fixed time basis.

12. The metering system of claim 11, wherein the message is an advertisement.

13. The system of claim 12, further comprising a mechanism for metering a click-through process, wherein the user clicks on the message to learn more about the advertisement.

14. The metering system of claim 11, further comprising a challenge-response mechanism, connected to the network, for causing the counting means to pause when the monitoring means is operatively disconnected from the conveying means.

15. A method for metering digital content being presented to users of a communication network, the digital content being contained in a network data stream and including a message embedded with a code to allow a number of times the message is presented to the users to be counted, the embedded code containing a rate code for calculating a charge to a client for presenting the message, said method comprising:
    monitoring the network data stream to detect data representative of the embedded code;
    recording a number of times the data representative of the embedded code is detected, the number of times the data representative of the embedded code is detected being indicative of presentation of the message to the users; and
    calculating a charge for presenting the message based on the rate code and the number of times the data representative of the embedded code is detected.

16. The method of claim 15, wherein the digital content includes an advertisement and the charge for presenting the message includes an advertisement charge.

17. The method of claim 16, further comprising:
debiting a client a monetary amount based on the calculated advertisement charge.

18. A method of metering digital content having a message to be presented to users of a communications network including the Internet, the message being presented in an image format implemented as a stream of image data contained in a network data stream, said image data having a code embedded therein, said method comprising:
monitoring the network data stream to detect the embedded code in the image data;
based on the detected embedded code, counting the number of times the message is presented to the users of the communications network; and
calculating a charge based on the number of times the message is presented to the users of the communications network.

19. The method of claim 18, wherein the code is embedded in a steganographic fashion.

20. The method of claim 18, wherein the message is presented by a server, and wherein the embedded code contains a client identity associated with a client responsible for paying the calculated charge for presenting the message in the digital content.

21. The method of claim 18, wherein the embedded code contains a rate code for calculating the charge for presenting the message in the digital content, said method further comprising:
calculating the charge based on the counted number of times and the rate code.

22. The method of claim 21, wherein the rate code includes a fixed rate.

23. The method of claim 21, wherein the rate code includes a variable rate based on the time and/or date of presenting the message to the users.

24. The method of claim 21, wherein the message is presented as an image on a display screen, and the image has a size relative to the display screen, and wherein the rate code contains a charge rate based on the image size.

25. The method of claim 21, wherein the communications network includes a plurality of destination domains, and wherein the rate code contains a charge rate based on the destination domain.

26. The method of claim 18, wherein the message is an advertisement.

27. A metering system for a communications network having network data, the metering system adapted to count the number of times a message included in digital content is presented to users of the communications network, the message being contained in the network data in the form of a data stream embedded with a code, the data stream being conveyed to the network by a conveying means, said system comprising:
means, operatively connected to the conveying means, for monitoring the data stream in order to detect the embedded code;
means, operatively connected to the monitoring means, for counting number of presentations based on the detected embedded code;
means for calculating a charge based on the counted number of presentations; and
a mechanism, remote from the monitoring means, for sending an authentication message to the monitoring means on a fixed time basis,
wherein the monitoring means is adapted to disable the counting means when the monitoring means does not receive the authentication message on the fixed time basis.

28. The metering system of claim 27, wherein the message is an advertisement.

29. The metering system of claim 27, further comprising a challenge-response mechanism, connected to the network, for causing the counting means to pause when the monitoring means is operatively disconnected from the conveying means.

* * * * *